United States Patent [19]

Watanabe et al.

[11] 4,306,030

[45] Dec. 15, 1981

[54] CARBON-CONTAINING REFRACTORY

[75] Inventors: Akira Watanabe, Okayama; Toshiyuki Matsuki, Bizen, both of Japan

[73] Assignee: Kyusyu Refractories Co., Ltd., Okayama, Japan

[21] Appl. No.: 116,782

[22] Filed: Jan. 30, 1980

[30] Foreign Application Priority Data

Feb. 9, 1979 [JP] Japan .................................. 54-14614

[51] Int. Cl.$^3$ ............................................. C04B 35/52
[52] U.S. Cl. ..................................... 501/99; 501/100; 501/101
[58] Field of Search ................................... 106/56, 65

[56] References Cited

U.S. PATENT DOCUMENTS

| | | | |
|---|---|---|---|
| 1,374,909 | 4/1921 | De Bats | 106/56 |
| 3,037,756 | 6/1962 | Ornitz | 106/56 |
| 3,227,566 | 1/1966 | Hilton et al. | 106/56 |
| 4,041,199 | 8/1977 | Cartwright | 106/56 |
| 4,059,662 | 11/1977 | Murakami et al. | 106/56 |
| 4,066,467 | 1/1978 | Rechter | 106/56 |

*Primary Examiner*—James Poer
*Attorney, Agent, or Firm*—Wenderoth, Lind & Ponack

[57] ABSTRACT

The invention relates to precluding the shortcomings intrinsic to the conventional unburned carbon-containing refractory bricks, i.e., oxidization under high temperature conditions and the incidental decarbonization, the phenomenon of exfoliation and detachment of the fragile layers, and more particularly to obtaining thereby unburned carbon-containing refractory bricks having the high properties by causing refractory brick material comprising substantially more than 1 weight % carbon to contain 1–10 weight % aluminum powder and/or magnesium powder each independently or in a mixture thereof, and/or 0.5–6 weight % silicon powder.

8 Claims, No Drawings

CARBON-CONTAINING REFRACTORY

The invention relates to unburned refractory bricks containing carbon.

Generally, carbon-containing refractory bricks are oxidized under high temperature conditions, for example, the heat treating temperature during the brick production and the operation temperature of the furnace in which the refractory bricks are used as wear lining members, whereby open pores are increased.

Consequently, an oxidizing gas, such as air and the like, tends to infiltrate into the refractory layer, the back layer of the operation surface becoming fragile due to decarbonization. Thus, the decarbonized fragile layer is exfoliated by the gas flow, molten steel flow, impact of material thrown into the furnace, and the like. Furthermore, as a result of an increase of open pores, slag tends to infiltrate therethrough until a compact layer is formed and cracked, the layer being exfoliated eventually. As described hereinabove, the conventional refractory bricks had various disadvantages.

In order to obviate the said disadvantages of the conventional unburned carbon-containing refractory bricks, there has been known a method of adding an antioxidant consisting of low fusing point components.

However, unburned carbon-containing refractory bricks containing such antioxidant has a reduced refractoriness in itself, its reaction to the flow of molten steel and slag at high temperatures being increased whereby its useful life is greatly impaired.

Thus, it is impossible to satisfactorily obviate the disadvantages of unburned carbon-containing refractory bricks by a simple addition of an antioxidant.

The inventors of the present invention have concentrated their energies on improvement of refractory bricks containing substantially more than 1 weight % of carbon in relation to the aforementioned disadvantages. As a result, it has been found that not only the disadvantages of the conventional unburned carbon-containing refractory bricks can be obviated but also high properties are obtainable by adding such metal powder as will be activated in a temperature range in which a carbonaceous binder is present in a constructionally unstable state as carbon.

In fine, the invention is particularly characterized in that refractory brick material containing substantially more than 1 weight % of carbon is caused to contain 1–10 weight % of aluminum powder or magnesium powder each independently or in a mixture thereof.

According to the invention, the unburned carbon-containing refractory bricks comprise carbonaceous material independently or carbonaceous material and inorganic refractory material, and contain substantially more than 1 weight %, and preferably 5–75 weight %, of carbon.

The carbonaceous material comprises plumbago, artificial graphite, electrode waste, petroleum coke, foundry coke, carbon black, etc., whilst the inorganic refractory material comprises general basic, neutral or acid oxides, such as magnesia, chrome, spinel, dolomite, alumina, silica, zircon, carbides, such as silicon carbide, titanium carbide and the like, and nitrides, such as silicon nitride, boron nitride and the like, among which magnesia, spinel and alumina are particularly preferable.

According to the invention, such binders as will generate carbon by heating, for example, tar, pitch, resin, etc., are added to and mixed with the aforesaid carbonaceous material and inorganic refractory material after controlling their fineness. The mixture is pressed and heated according to the ordinary process to obtain unburned carbon-containing refractory bricks. The unburned carbon-containing refractory bricks may be fitted with metal at the time of pressing thereby enabling to use them as metal-cased bricks.

The use of the unburned carbon-containing refractory bricks is not particularly limited; they will be useful when applied to the hot spot part and slag line part of an electric-arc furnace as well as the slag line part, steel melting part and molten steel contacting part of a refining ladle.

A first characteristic feature of the invention consists in that metal powder of aluminum and/or magnesium is added to and mixed with the material of the aforesaid unburned carbon-containing refractory bricks.

It appears that the metal powders added to and mixed with the material preclude cohesion between carbon at its active point and oxygen by cohering with carbon at its active point remaining in the material in a structurally unstable condition in a high temperature range, whereby the rate of residual carbon in the bonded part is remarkably increased. Synchronously the excessive metal powders are turned into carbides in reaction to the other carbonaceous materials, the volume of each pore being reduced due to cubical expansion, and thus the brick structure is compacted thereby enabling to obviate the infiltration of air and slag.

The metal powders capable of displaying such properties comprise aluminum powder and magnesium powder. These metals can be used each independently or in a mixture thereof. It is to be noted, however, that the use of aluminum powder is particularly effective.

The particle diameter of the metal powder is preferably less than 0.125 mm particularly in respect of reactivity. The suitable content is 1–10 weight %, and preferably 1–6 weight %.

If the metal powder content is less than 1 weight %, not only the addition is effectless but also the high effect of carbonaceous material is not fully utilizable since the carbon content in the brick can not be increased, whilst if the metal powder content is in excess of 10 weight %, an ill effect arises due to growth of carbides of active metals in a large amount.

If the carbides in the refractory bricks are brought into contact with water, hydrates are produced due to hydrolysis thereby giving rise to undesirable phenomena of cracks, collapse and the like.

An excessive content of metal powders is compositionally unpreferable also in respect of deterioration of resistance to melting loss.

The unburned carbon-containing refractory bricks according to the invention have a construction as described hereinabove. They can display high properties when used as wear lining of a furnace and the like. However, they have the following defects when brought into contact with water under the operational conditions.

The activated metal powders added to the material of unburned carbon-containing refractory bricks produce carbides in combination with carbon in the bricks under heating conditions when pressed bricks are used as wear lining of the furnace. If the said carbides are brought into contact with water at high temperatures, the following reactions proceed.

$Al_4C_3 + 12 H_2O \rightarrow 3CH_4 + 4Al(OH)_3$ $MgC_2 + 2H_2O \rightarrow Mg(OH)_2 + C_2H_2$ As a result, the brick structure is deteriorated with the growth of cracks or even collapsed. As described hereinbefore, such phenomenon is particularly conspicuous in the range where the addition of metal powders is in excess of 10 weight %.

The inventors of the present invention have found that addition of silicon powder can satisfactorily prevent the hydration of carbides.

A second characteristic feature of the invention consists in that the material of the unburned carbon-containing refractory bricks is caused to contain 1–10 weight % aluminum powder or magnesium powder each independently or in a mixture thereof, and is further caused to contain 0.5–6 weight % silicon powder.

The silicon powder is used in order to prevent aluminum or magnesium carbides from reacting to water. Its particle diameter is preferably less than 0.125 mm, whilst the amount of addition is 0.5–6 weight %, and preferably 1–4 weight %. If the content of the silicon powder is less than 0.5 weight %, the addition is effectless, whilst addition in excess of 6 weight % is unpreferable inasmuch as the resistance to melting loss is compositionally impaired.

It is preferable that the addition of silicon is increased in conformity with that of aluminum. The particularly suitable ratio of addition is 0.2–1.0 weight % silicon to 1 weight % aluminum.

To be more precise, the object of adding silicon consists in prevention of hydration of carbides. This object is attainable by the combined use of aluminum powder and magnesium powder. Therefore, it is distinctly different from the effect of prevention of oxidation in the conventional case of independent addition of silicon.

The effects obtainable from the unburned carbon-containing refractory bricks according to the invention are as follows.

(1) The addition of activated metal powder enables to improve the rate of residual carbon of the carbonaceous binding material, increase the strength thereof and reduce the apparent porosity.

(2) The activated metal powder expands its cubical volume by forming carbides in the intermediate temperature range, whereby the apparent porosity is further decreased and the oxidation resistance is greatly improved.

(3) The carbides adjacent the operation surface are turned into oxides through reaction to air under high temperatures, and then formed into an antioxidant film through further reaction to other refractory material thereby enabling to prevent the deterioration of strength and the resultant exfoliation phenomenon due to decarbonization of the back layer of the operation surface.

(4) The addition of silicon powder enables to obviate deterioration of the structure by preventing hydration of the carbides.

Thus, the unburned carbon-containing refractory bricks according to the invention enables to greatly prolong the useful life of the furnace when used as wear lining.

The invention will be described in more detail in reference to the following examples.

EXAMPLES 1–11

Mixtures according to the compositions as shown in Table 1 were prepared. The mixtures were pressed and heat treated at 300° C. for 4 hours to produce samples. Comparative Samples 1–7 were also produced by the same process. The samples thus obtained were subjected to examinations of the value of physical properties after reducing treatment at 1000° C., the rates of weight reduction after heating at 1000° C. and 1400° C. respectively, and the modulus of rupture at 1400° C., as well as a slag test.

The results were shown in Table 1.

In Examples 10 and 11 and Compartive Examples 6 and 7, pelleted graphite was used.

TABLE 1

| | Example 1 | Example 2 | Example 3 | Example 4 | Example 5 | Comparative Example 1 |
|---|---|---|---|---|---|---|
| Composition of Material (weight %) | | | | | | |
| MgO | 82 | 82 | 82 | 73 | 73 | 85 |
| $Al_2O_3$ | | | | | | |
| $MgO \cdot Al_2O_3$ | | | | | | |
| graphite | 15 | 15 | 15 | 15 | 15 | 15 |
| aluminum powder | 3 | 5 | | 3 | | |
| magnesium powder | | | 3 | | 3 | |
| silicon powder | | | | 3 | 3 | |
| resinous pitch (out) | 2.5 | 2.5 | 2.5 | 2.5 | 2.5 | 2.5 |
| thermosetting phenolic resin(out) | 3.5 | 3.5 | 3.5 | 3.5 | 3.5 | 3.5 |
| Value of Physical Properties | | | | | | |
| apparent porosity (%) after reducing treatment at 1000° C. for 2 hours | 10.5 | 10.1 | 10.7 | 9.5 | 9.7 | 11.4 |
| crushing strength (kg/cm$^2$) under same condition | 355 | 400 | 350 | 470 | 430 | 310 |
| weight reduction rate (%) *1 under same condition | 2.99 | 2.85 | 3.04 | 2.65 | 2.70 | 3.32 |
| weight reduction rate (%) *2 after heating at 1000° C. | 3.92 | 3.46 | 4.02 | 3.44 | 3.48 | 4.76 |
| weight reduction rate (%) *2 after heating at 1400° C. | 4.76 | 3.93 | 4.99 | 2.62 | 3.85 | 7.11 |
| modulus of rupture at 1400° C. reducing atmosphere(kg/cm$^2$) | 84 | 112 | 78 | 152 | 121 | 55 |
| slag test *3 melting loss measurement (mm) | 20.5 | 19.5 | 20.5 | 16.0 | 19.0 | 25.5 |
| slag test *3 decarbonized fragile layer | 0 | 0 | 0 | 0 | 0 | 3.0 |
| | Example | Comparative | Example | Comparative | Example | Comparative |

TABLE 1-continued

|  | 6 | Example 2 | 7 | Example 3 | 8 | Example 4 |
|---|---|---|---|---|---|---|
| Composition of Material (weight %) | | | | | | |
| MgO | 5 | 5 | 5 | 5 | 90 | 93 |
| $Al_2O_3$ | 77 | 80 | | | | |
| $MgO \cdot Al_2O_3$ | | | 77 | 80 | | |
| graphite | 15 | 15 | 15 | 15 | 7 | 7 |
| aluminum powder | 3 | | 3 | | 3 | |
| magnesium powder | | | | | | |
| silicon powder | | | | | | |
| resinous pitch (out) | 2.5 | 2.5 | 2.5 | 2.5 | 2.0 | 2.0 |
| thermosetting phenolic resin(out) | 3.5 | 3.5 | 3.5 | 3.5 | 3.0 | 3.0 |
| Value of Physical Properties | | | | | | |
| apparent porosity (%) after reducing treatment at 1000° C. for 2 hours | 10.6 | 11.5 | 10.6 | 11.5 | 9.8 | 10.9 |
| crushing strength (kg/cm²) under same condition | 350 | 285 | 350 | 290 | 555 | 490 |
| weight reduction rate (%) *1 under same condition | 3.03 | 3.38 | 3.01 | 3.35 | 2.51 | 2.79 |
| weight reduction rate (%) *2 after heating at 1000° C. | 4.04 | 5.25 | 3.98 | 5.08 | 3.31 | 4.08 |
| weight reduction rate (%) *2 after heating at 1400° C. | 4.87 | 7.72 | 4.80 | 7.44 | 4.31 | 6.32 |
| modulus of rupture at 1400° C. reducing atmosphere(kg/cm²) | 82 | 49 | 83 | 51 | 95 | 63 |
| slag test *3 melting loss measurement (mm) | 21.0 | 27.5 | 21.0 | 26.5 | 21.0 | 26.5 |
| slag test *3 decarbonized fragile layer | 0 | 4.0 | 0 | 3.5 | 0 | 3.5 |

|  | Example 9 | Comparative Example 5 | Example 10 | Example 11 | Comparative Example 6 | Comparative Example 7 |
|---|---|---|---|---|---|---|
| Composition of Material (weight %) | | | | | | |
| MgO | 71 | 75 | 45 | 25 | 50 | 30 |
| $Al_2O_3$ | | | | | | |
| $MgO \cdot Al_2O_3$ | | | | | | |
| graphite | 25 | 25 | 50 | 70 | 50 | 70 |
| aluminum powder | 4 | | 5 | 5 | | |
| magnesium powder | | | | | | |
| silicon powder | | | | | | |
| resinous pitch (out) | 2.0 | 2.0 | | | | |
| thermosetting phenolic resin(out) | 3.5 | 3.5 | 10 | 12 | 10 | 12 |
| Value of Physical Properties | | | | | | |
| apparent porosity (%) after reducing treatment at 1000° C. for 2 hours | 10.9 | 11.9 | 10.2 | 11.0 | 11.1 | 11.7 |
| crushing strength (kg/cm²) under same condition | 280 | 230 | 195 | 175 | 160 | 150 |
| weight reduction rate (%) *1 under same condition | 2.77 | 3.07 | 4.71 | 5.77 | 5.45 | 6.58 |
| weight reduction rate (%) *2 after heating at 1000° C. | 4.32 | 5.77 | 6.16 | 7.83 | 7.97 | 9.51 |
| weight reduction rate (%) *2 after heating at 1400° C. | 5.20 | 9.12 | 8.33 | 10.67 | 12.51 | 15.03 |
| modulus of rupture at 1400° C. reducing atmosphere(kg/cm²) | 71 | 44 | 56 | 50 | 42 | 38 |
| slag test *3 melting loss measurement (mm) | 19.5 | 24.5 | 20.5 | 22.5 | 24.0 | 26.5 |
| slag test *3 decarbonized fragile layer | 0 | 3.0 | 0.5 | 1.0 | 3.0 | 4.0 |

N.B.
*1 shows the values based on the weights after pressing.
*2 shows the values based on the weights after the samples were held in electric furnace using heating element of silicon carbide at a predetermined temperature for 1 hour and then subjected to heat treatment at 300° C.
*3 shows the results of tests in which each sample was sylindrically formed, rotated in a horizontal disposition, and heated by throwing slag thereinto under the following conditions. Examples 1–9 and Comparative Examples 1–5: 1750° C.×5 hrs, furnace iron sheath without water cooling; Example 10, 11 and Comparative Example 6, 7:1700° C.×5 hrs, furnace iron sheath water cooled.

The results of Table 1 substantiate that the examples according to the invention surpass the comparative examples in every respect of properties as follows.
 (1) All the physical properties have been improved.
 (2) Smaller rate of weight reduction after reducing treatment at 1000° C. shows an increase of residual carbon rate.
 (3) Smaller rates of weight reduction after heat treatments at 1000° C. and 1400° C. show improvement of oxidation resistance.
 (4) The modulus of rupture and slag resistance have been greatly improved.

The temperatures of heat treatment, 1000° C. and 1400° C., in the aforesaid Items (2) and (3) are determined in the assumption of the use of an actual furnace.

EXAMPLES 12–14

With an object of substantiating the effect of the invention in the case of adding silicon powder, mixtures according to the composition as shown in Table 2 were prepared and samples were produced in the same manner as in Examples 1–11. Comparative Sample 8 was also produced by the same process without adding silicon powder.

The samples were heated at 1650° C. on the assumption of the use of an actual furnace and then ejected into water. The samples were left as they stood for 10 days to see how the cracks were developed. The results were as shown in Table 2. The addition of silicon powder enabled to obviate resolution of $Al_4C_3$, whereby development of cracks was greatly reduced compared with the case of the comparative sample

TABLE 2

|  | Example 12 | Example 13 | Example 14 | Comparative Example 8 |
| --- | --- | --- | --- | --- |
| Composition of Material (wt %) | | | | |
| magnesia clinker | 81 | 80 | 79 | 82 |
| graphite | 15 | 15 | 15 | 15 |
| aluminum powder | 3 | 3 | 3 | 3 |
| silicon powder | 1 | 2 | 3 | — |
| resinous pitch | 2.5 | 2.5 | 2.5 | 2.5 |
| thermosetting phenolic resin | 3.5 | 3.5 | 3.5 | 3.5 |
| Degree of Cracks | small | slight | nil | great |

What is claimed is:

1. Unburned carbon-containing refractory bricks consisting essentially of 5-75 weight % of a carbonaceous material, 1-10 weight % of a metal powder selected from the group consisting of aluminum powder, magnesium powder or mixtures thereof, and wherein the residual portion of the brick consists essentially of an inorganic refractory material.

2. Unburned carbon-containing refractory bricks as defined in claim 1, wherein the carbonaceous material is selected from the group consisting of natural graphite, artificial graphite, electrode waste, petroleum coke, foundry coke, carbon black or mixtures thereof.

3. Unburned carbon-containing refractory bricks as defined in claim 1 wherein the inorganic refractory material is selected from the group consisting of magnesia, chrome, spinel, dolomite, alumina, zircon, silicon carbide, titanium carbide, silicon nitride, and boron nitride.

4. Unburned carbon-containing refractory bricks consisting essentially of 5-75 weight % of a carbonaceous material, 1-10 weight % of a metal powder selected from the group consisting of aluminum powder, magnesium powder or mixtures thereof, 0.5-6.0 weight % silicon powder, and wherein the residual portion of the brick consists essentially of an inorganic refractory material.

5. Unburned carbon-containing refractory bricks as defined in claim 4 wherein the carbonaceous material is selected from the group consisting of natural graphite, artificial graphite, electrode waste, petroluem coke, foundry coke, carbon black or mixtures thereof.

6. Unburned carbon-containing refractory bricks as defined in claim 4 wherein the inorganic refractory material is selected from the group consisting of magnesia, chrome, spinel, dolomite, alumina, zircon, silicon carbide, titanium carbide, silicon nitride, and boron nitride.

7. A wear lining structure of a furnace made of unburned carbon-containing bricks which bricks consist essentially of 5-75% of a carbonaceous material, 1-10% by weight of a metal powder selected from the group consisting of aluminum powders, magnesium powders or mixtures thereof and wherein the residual portion of the brick consists essentially of an inorganic refractory material.

8. A wear lining furnace according to claim 7 which also contains 0.5-6.0 wt. percent of silicon powder.

* * * * *